US012707525B2

(12) United States Patent
Zhong et al.

(10) Patent No.: US 12,707,525 B2
(45) Date of Patent: Aug. 11, 2026

(54) INFORMATION TRANSMISSION METHOD AND APPARATUS, TERMINAL, AND NETWORK SIDE DEVICE

(71) Applicant: VIVO MOBILE COMMUNICATION CO., LTD., Chang'an Dongguan (CN)

(72) Inventors: Tingting Zhong, Chang'an Dongguan (CN); Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 436 days.

(21) Appl. No.: 18/105,138

(22) Filed: Feb. 2, 2023

(65) Prior Publication Data

US 2023/0189381 A1 Jun. 15, 2023

Related U.S. Application Data

(63) Continuation of application No. PCT/CN2021/110908, filed on Aug. 5, 2021.

(30) Foreign Application Priority Data

Aug. 6, 2020 (CN) ........................ 202010787339.6

(51) Int. Cl.
*H04W 76/20* (2018.01)
*H04W 4/06* (2009.01)
*H04W 76/30* (2018.01)

(52) U.S. Cl.
CPC ............ *H04W 76/20* (2018.02); *H04W 4/06* (2013.01); *H04W 76/30* (2018.02)

(58) Field of Classification Search
CPC .. H04L 5/0091; H04W 12/08; H04W 72/231; H04W 72/30; H04W 76/20; H04W 76/30; Y02D 30/70
See application file for complete search history.

(56) References Cited

U.S. PATENT DOCUMENTS

2004/0102212 A1* 5/2004 Sarkkinen ............ H04W 12/08 455/552.1
2004/0147266 A1 7/2004 Hwang et al.
2005/0083884 A1* 4/2005 Lee ...................... H04W 72/30 709/231
2011/0194428 A1* 8/2011 Wang .................... H04W 72/30 370/312

(Continued)

FOREIGN PATENT DOCUMENTS

CN 105191177 A 12/2015
CN 106031200 A 10/2016

(Continued)

OTHER PUBLICATIONS

U.S. Appl. No. 62/951,038, filed 2019.*

(Continued)

*Primary Examiner* — Dung B Huynh
(74) *Attorney, Agent, or Firm* — Price Heneveld LLP

(57) ABSTRACT

This application discloses an information transmission method and apparatus, a terminal, and a network side device. The information transmission method according to this application includes: obtaining configuration information of a multimedia broadcast service through radio resource control RRC signaling.

17 Claims, 6 Drawing Sheets

(56) References Cited

U.S. PATENT DOCUMENTS

2011/0230220 A1 9/2011 Chen
2011/0319011 A1* 12/2011 Dong .................... H04L 12/189 455/3.01
2013/0010671 A1* 1/2013 Kim ...................... H04W 72/30 370/312
2013/0294325 A1* 11/2013 Lee ......................... H04W 4/06 370/312
2014/0204830 A1* 7/2014 Wang .................... H04W 48/10 370/312
2014/0233452 A1* 8/2014 Kim .................... H04L 12/1881 370/312
2014/0269566 A1 9/2014 Wang et al.
2015/0043533 A1* 2/2015 Kim ...................... H04W 48/20 370/331
2015/0334769 A1* 11/2015 Kim .................... H04W 36/362 370/329
2015/0373507 A1* 12/2015 Jung ....................... H04L 47/12 370/235
2016/0021516 A1* 1/2016 Han ........................ H04W 4/06 370/312
2016/0044634 A1 2/2016 Seo et al.
2016/0095084 A1* 3/2016 Koskinen .............. H04W 68/02 455/458
2016/0212595 A1* 7/2016 Fukuta .................... H04W 4/06
2016/0330644 A1* 11/2016 Li ........................... H04W 4/06
2017/0013433 A1 1/2017 Lee et al.
2017/0245121 A1* 8/2017 Jung ..................... H04W 48/20
2017/0272968 A1* 9/2017 Kim ...................... H04W 24/10
2017/0273007 A1* 9/2017 Jung ....................... H04L 67/61
2017/0310718 A1* 10/2017 Kim .................. H04W 36/0058
2018/0035265 A1* 2/2018 Kim ...................... H04W 48/12
2018/0042033 A1* 2/2018 Xu .......................... H04L 1/004
2018/0124674 A1* 5/2018 Vutukuri ................. H04W 4/10
2018/0131458 A1* 5/2018 Fukuta .................... H04W 4/06
2018/0160342 A1* 6/2018 Park .................. H04W 36/0033
2018/0160436 A1* 6/2018 Park ...................... H04W 76/14
2018/0176744 A1* 6/2018 Li ........................... H04W 4/06
2019/0075614 A1* 3/2019 Li ........................... H04L 51/58
2019/0191279 A1* 6/2019 Fujishiro ........... H04W 72/0446
2019/0215214 A1* 7/2019 Kim ...................... H04W 84/06
2019/0230564 A1* 7/2019 Kim ........................ H04W 4/06
2019/0261449 A1* 8/2019 Kim .................... H04L 65/1046
2019/0268879 A1* 8/2019 Lee ...................... H04B 7/0695
2019/0268964 A1* 8/2019 Lee ....................... H04W 76/14
2019/0386771 A1* 12/2019 Liu ...................... H04B 7/0456
2020/0178322 A1* 6/2020 Samal ................... H04W 76/11
2020/0413241 A1* 12/2020 Park ...................... H04W 76/22
2021/0076303 A1* 3/2021 Liang .................... H04W 48/10
2021/0144516 A1* 5/2021 Kim .................... H04W 72/046
2021/0185566 A1* 6/2021 Zhu ......................... H04W 4/70
2021/0258741 A1* 8/2021 Phuyal .................... H04W 4/50
2021/0392466 A1* 12/2021 Liu ....................... H04W 24/10
2021/0410045 A1* 12/2021 Kadiri ................... H04W 48/06
2022/0141904 A1* 5/2022 Yilmaz ................. H04W 76/27 370/329
2022/0159628 A1* 5/2022 Bangolae .............. H04W 74/02
2022/0210614 A1* 6/2022 Wang ...................... H04W 4/50
2022/0217616 A1* 7/2022 Wu ..................... H04W 74/002
2022/0303883 A1* 9/2022 Gao ....................... H04W 48/16
2022/0345999 A1* 10/2022 Fu ......................... H04W 48/18
2023/0021294 A1 1/2023 Wu
2023/0029998 A1* 2/2023 Narayanan Thangaraj ................. H04W 72/30
2023/0040079 A1* 2/2023 Qu ........................ H04W 24/10
2023/0040690 A1* 2/2023 Chen ..................... H04L 5/0053
2023/0093727 A1* 3/2023 Lin ....................... H04L 1/0061 370/312
2023/0180029 A1* 6/2023 Peng ..................... H04W 24/02 370/252
2023/0300682 A1* 9/2023 Pham Van ........ H04W 36/0007 370/312
2023/0345351 A1* 10/2023 Lindheimer .......... H04L 63/104
2024/0214855 A1* 6/2024 Kim ...................... H04W 24/10
2024/0259906 A1* 8/2024 Freda .................. H04W 36/302
2025/0151153 A1* 5/2025 Chun .................... H04W 76/27
2025/0176057 A1* 5/2025 Chun .................... H04W 76/10
2025/0234414 A1* 7/2025 Xu ........................ H04W 76/19
2025/0261204 A1* 8/2025 Malkamäki ........... H04L 1/1896
2026/0006678 A1* 1/2026 Xu .......................... H04W 4/06
2026/0019350 A1* 1/2026 Xu ...................... H04L 41/5067
2026/0032763 A1* 1/2026 Fujishiro ............... H04W 76/27
2026/0052413 A1* 2/2026 Barac .................... H04W 24/10
2026/0067988 A1* 3/2026 Sha ....................... H04W 76/27

FOREIGN PATENT DOCUMENTS

EP 1439668 A2 7/2004
JP 2011199869 A 10/2011
JP 2014529936 A 11/2014
WO 2018032469 A1 2/2018
WO 2021127069 A1 6/2021
WO 2021190445 A1 9/2021

OTHER PUBLICATIONS

U.S. Appl. No. 63/044,339, filed 2020.*

Qualcomm Incororporated., "Solution to KI#7: Mobility between 5G MBS supporting and 5G MBS non-supporting NG RAN nodes," SA WG2 Meeting #139E, S2-2004223 (Revision of S2-200xxxx), pp. 1-3, (Jun. 12, 2020).

Ericsson., "KI #1, Sol #2: Solution 2 update," SA WG2 Meeting #139E, S2-2004700 (Revision of S2-2003679r06), pp. 1-16, (Jun. 12, 2020).

International Search Report and Written Opinion of the International Searching Authority dated Nov. 4, 2021 as received in Application No. PCT/CN2021/110908.

Huawei et al., "Discussion on NPDCCH Search Space for Multicast in NB-IoT," 3GPP TSG RAN WG1 Meeting *86bis, Lisbon, Portugal, Oct. 10-14, 2016, R1-1608614, 5 pages.

"5G NR Upper Layer Specifications," NTT Docomo Technical Journal, vol. 26, No. 3, Japan, Nov. 2018, 30 pages.

"Discussion on Idle and Inactive Mode UEs," Vivo, 3GPP TSG-RAN WG2 Meeting #111, e-meeting, Aug. 17-28, 2020, 5 pages.

Office Action for EP21854520.0-1206 dated Feb. 2, 2026, 8 pages.

* cited by examiner

UE
Network side (Network)
RRC re-establishment request (RRCRe-establishmentRequest)
RRC setup (RRCSetup)
RRC setup complete (RRCSetupComplete)

Start
Send configuration information of a multimedia broadcast service through radio resource control RRC signaling
801
End Information transmission apparatus
900
First obtaining module
901

INFORMATION TRANSMISSION METHOD AND APPARATUS, TERMINAL, AND NETWORK SIDE DEVICE

CROSS-REFERENCE TO RELATED APPLICATIONS

This application is continuation application of PCT International Application No. PCT/CN2021/110908 filed on Aug. 5, 2021, which claims the priority of Chinese Patent Application No. 202010787339.6 filed in China on Aug. 6, 2020, which is incorporated herein by reference in its entirety.

TECHNICAL FIELD

The present application relates to the field of communication technologies, and in particular, to an information transmission method and apparatus, a terminal, and a network side device.

BACKGROUND

A long term evolution (LTE) multimedia broadcast multicast service (MBMS) is in a multicast transmission mode on a radio access network (RAN) side. Configuration information of a multimedia broadcast service (MBS) in new radio (NR) is sent through a multicast control channel (MCCH) or a single cell multicast control channel (SC-MCCH). The MCCH and the SC-MCCH are sent periodically. In some cases, a UE may only need to monitor whether the configuration information changes, and does not need to obtain the configuration information. In this case, network resources are wasted.

SUMMARY

According to a first aspect, an information transmission method is provided, and applied to a terminal. The method includes:

obtaining configuration information of a multimedia broadcast service through radio resource control RRC signaling.

According to a second aspect, an information transmission apparatus is provided, and applied to a terminal. The apparatus includes:

a first obtaining module, configured to obtain configuration information of a multimedia broadcast service through radio resource control RRC signaling.

According to a third aspect, an information transmission method is provided, and applied to a network side device. The method includes:

sending configuration information of a multimedia broadcast service through radio resource control RRC signaling.

According to a fourth aspect, an information transmission apparatus is provided, and applied to a network side device. The apparatus includes:

a first sending module, configured to send configuration information of a multimedia broadcast service through radio resource control RRC signaling.

According to a fifth aspect, a terminal is provided, the terminal including a processor, a memory, and a program or an instruction stored in the memory and executable by the processor, the program or instruction, when executed by the processor, implementing steps of the method according to the first aspect.

According to a sixth aspect, a network side device is provided, the network side device including a processor, a memory, and a program or an instruction stored in the memory and executable by the processor, the program or instruction, when executed by the processor, implementing steps of the method according to the third aspect.

According to a seventh aspect, a readable storage medium is provided, storing a program or an instruction, the program or instruction, when executed by a processor, implementing steps of the method according to the first aspect, or steps of the method according to the third aspect.

According to an eighth aspect, a chip is provided, including a processor and a communication interface, the communication interface being coupled to the processor, and the processor being configured to run a program or an instruction of a network side device to implement the method according to the first aspect, or the method according to the third aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as “first” and “second” in the specification and the claims of this application are intended to distinguish between similar objects, but are not used for describing a specific sequence or a chronological order. It is to be understood that the data used in such a way is interchangeable in proper circumstances, so that the embodiments of this application can be implemented in other sequences than the sequence illustrated or described herein. In addition, objects distinguished by “first” and “second” are usually of one type, and a quantity of the objects is not limited. For example, a first object may be one or more than one. In addition, “and/or” in the specification and claims represents at least one of connected objects. The character “/” generally indicates an “or” relationship between the associated objects.

It is worth noting that technologies described in the embodiments of this application are not limited to an LTE-Advanced (LTE-A) system of long term evolution (LTE)/LTE, but may further be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FMA) and other systems. The terms “system” and “network” in the embodiments of this application are often used interchangeably, and the described technologies may be used for not only the foregoing systems and radio technologies, but also other systems and radio technologies. However, the following description describes a new radio (NR) system for a purpose of example, and an NR term is used in many parts of the following description. These technologies are also applicable to an application other than an NR system application, such as a 6$^{th}$ generation (6G) communication system.

Figure 1:
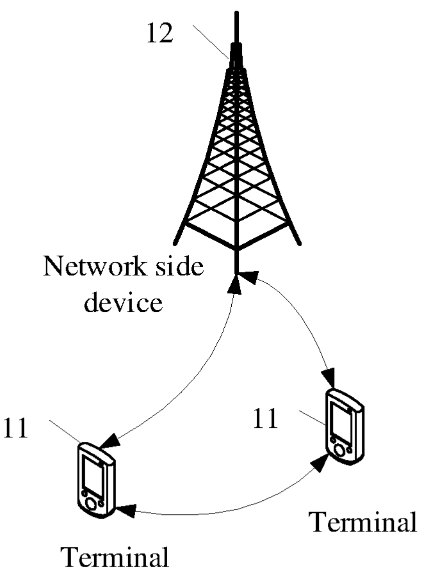
FIG. 1 is a structural diagram of a network system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), pedestrian user equipment (PUE), and the like. The wearable device includes: a bracelet, a headphone, glasses, and the like. It needs to be noted that, the embodiments of this application do not limit a specific type of the terminal 11. The network side device 12 may be a base station or a core network. The base station may be referred to as node B, evolved node B, access point, base transceiver station (BTS), radio base station, radio transceiver, basic service set (BSS), extended service set (ESS), node B, evolved node B (eNB), home node B, home evolved node B, WLAN access point, WiFi node, transmitting receiving point (TRP), or some another suitable term in the described art. As long as the same technical effect is achieved, the base station is not limited to a specific technical term. It needs to be noted that, in the embodiments of this application, only a base station in the NR system is used as an example, but a specific type of the base station is not limited.

In order to enable those skilled in the art to better understand the embodiments of this application, the following descriptions are given first.

1. Description related to an LTE MBMS.

Sending methods of a multimedia broadcast multicast service (MBMS) include the following two methods:

MBMS sending method 1: Send through a physical multicast channel (PMCH) in an MBMS single frequency network (Multimedia Broadcast multicast service Single Frequency Network) subframe. A control channel is sent through system information (e.g. SIB13) and a multicast control channel (MCCH), and data is sent through a multicast traffic channel (MTCH).

MBMS sending method 2: Single cell point to multipoint (SC-PTM):

Send through a physical downlink shared channel (PDSCH) scheduled by a physical downlink control channel (PDCCH). Control information is sent through system information (e.g. SIB20) and a single cell multicast control channel (SC-MCCH), and data is sent through a single cell multicast traffic channel (SC-MTCH). The SC-MCCH is sent through a PDSCH scheduled by a single cell radio network temporary identity (SC-RNTI) PDCCH, and the SC-MTCH is sent through a PDSCH scheduled by a group radio network temporary identity (G-RNTI) PDCCH.

2. LTE MBMS SC-PTM Service Continuity:

User service description (USD): Before the MBMS service starts, a network informs UE of the USD. In the USD, an application/service layer provides temporary mobile group identity (TMGI), session start and end time, frequency, and MBMS service area identity (SAI) belonging to an MBMS service area for each service.

SAI(s) of a current frequency and an adjacent frequency are provided in a system information block (SIB) 15. If one or more values in SAI(s) of a certain frequency are the same as SAI(s) in the USD, UE considers that the frequency can provide the MBMS service. It is worth noting that both an MBMS cell and a non-MBMS cell can provide the SIB15 as long as the cell is a primary cell (Pcell).

A SIB20 provides information for obtaining the SC-MCCH. The information is control information of the SC-PTM in the SC-MCCH, and provides scheduling information of all MBMS services in a current cell and a support situation of each MBMS service supported by the current cell of a neighboring cell. It is worth noting that the SIB15 can only be provided by the MBMS cell, and the cell is a primary cell (Pcell).

3. LTE MBMS Cell Reselection Priority:

If the UE can perform SC-PTM reception, and the UE is receiving or interested in receiving the MBMS service, and can receive the MBMS service only when residing on a frequency providing the MBMS service, the UE can regard the frequency as a highest priority during an MBMS session.

The following describes the information transmission method provided in the embodiments of this application in detail through specific embodiments and application scenarios thereof with reference to the accompanying drawings.

Figure 2:
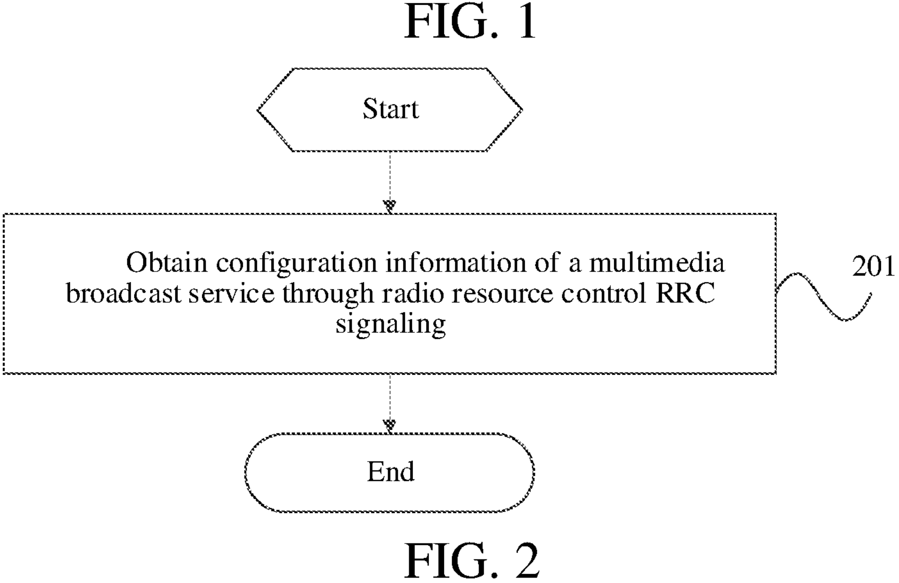
FIG. 2 is a schematic flowchart of an information transmission method applied to a terminal according to an embodiment of this application.

As shown in FIG. 2, according to an embodiment of this application, an information transmission method is provided, and applied to a terminal. The method includes:

Step 201. Obtain configuration information of a multimedia broadcast service through radio resource control RRC signaling.

Optionally, the configuration information of the multimedia broadcast service MBS includes at least one of:

information related to multimedia broadcast service MBS scheduling; or information related to service continuity of the multimedia broadcast service MBS.

The information related to MBS scheduling may specifically be scheduling information of the MBS service. The information related to the service continuity of the MBS is all information related to the service continuity, such as a multimedia broadcast service situation (such as SAI of LTE) supported by a current frequency or an adjacent frequency, a multimedia broadcast service situation (such as TMGI of LTE) supported by a current cell, and the like.

In the embodiments of this application, configuration information of an MBS service is sent through RRC signaling. Compared with the periodic transmission of the MCCH and the SC-MCCH, the RRC signaling is sent as needed by each terminal, thereby reducing signaling overheads and energy consumption in certain cases.

Optionally, the step of obtaining configuration information of a multimedia broadcast service through radio resource control RRC signaling includes:

initiating an RRC connection event; and obtaining the configuration information of the multimedia broadcast service through the RRC signaling in the RRC connection event;

where the RRC connection event includes:

an RRC connection establishment process, or an RRC connection resume process, or an RRC connection re-establishment process.

It needs to be noted that, the RRC connection establishment process (RRC connection establishment) corresponds to idle UE, the RRC connection resume process (RRC connection resume) corresponds to inactive UE, and the RRC connection re-establishment process (RRC connection re-establishment) corresponds to RRC connected UE.

In the embodiments of this application, the UE obtains the configuration information of the MBS service by initiating the RRC connection establishment process, the RRC connection resume process, or the RRC connection re-establishment process.

Optionally, a triggering condition of the RRC connection event includes at least one of:

the terminal has a multimedia broadcast service capability;

the terminal is interested in the multimedia broadcast service;

the terminal is receiving the multimedia broadcast service; or a configuration of the multimedia broadcast service is updated.

Whether the RRC connection establishment process, the RRC connection resume process, or the RRC connection re-establishment process is triggered, at least one of the following is met: the UE has an MBS capability; the UE is interested in the MBS; the UE is receiving the MBS; and configuration of the MBS is updated.

Optionally, a cause value in the RRC connection event is a cause value already defined or a newly set cause value;

The cause value already defined is applicable to MBS configuration. The newly set cause value is a cause value different from the cause value already defined.

the cause value in the RRC connection event includes at least one of:

a value of an establishment cause during the RRC connection establishment process;

a value of a resume cause during the RRC connection resume process; or a value of a re-establishment cause during the RRC connection re-establishment process. The value of the establishment cause (establishmentCause) is used for indicating an establishment cause in an RRC setup request; the value of the resume cause (resumeCause) is used for indicating a resume cause in an RRC resume request; and the value of the re-establishment cause (reestablishmentCause) is used for indicating a re-establishment cause in an RRC re-establishment request.

Optionally, the newly set cause value is a cause value that is different from the cause value already defined and can be used for MBS configuration.

For example, a value of a defined establishment cause (establishmentCause), a value of a defined resume cause (resumeCause), or a value of a defined re-establishment cause (reestablishmentCause) may be: mo-Data, mo-Signaling, and the like. A value of a newly set establishment cause (establishmentCause), a value of a newly set resume cause (resumeCause), or a value of a newly set re-establishment cause (reestablishmentCause) may be MBS Configuration, and the like.

Optionally, unified access control (UAC) in the RRC connection establishment process or the RRC connection resume process includes at least one of:

an access attempt is directly allowed without performing a UAC check;

a defined access value, where the defined access value is applicable to a case of MBS configuration; and a newly set access value, where the newly set access value is an access value different from the defined access value, and the newly set access value is applicable to a case of MBS configuration.

The access value includes at least one of a value of an access category or a value of an access identity.

The access value includes at least one of a value of an access category and a value of an access identity (Access identities), and the newly set access value is an access value different from the defined access value. Specifically, for example, an Access category of the defined access value is 7 and an Access identity of the defined access value is 0, and an Access category of the newly set access value is 11 and an Access identity of the newly set access value is 6.

Optionally, the RRC signaling includes at least one of:

an RRC reject message (RRCReject message);

an RRC re-establishment message (RRCReestablishment message);

an RRC setup message (RRCSetup message);

an RRC resume message (RRCResume message); or an RRC release message (RRCRelease message).

Figure 3:
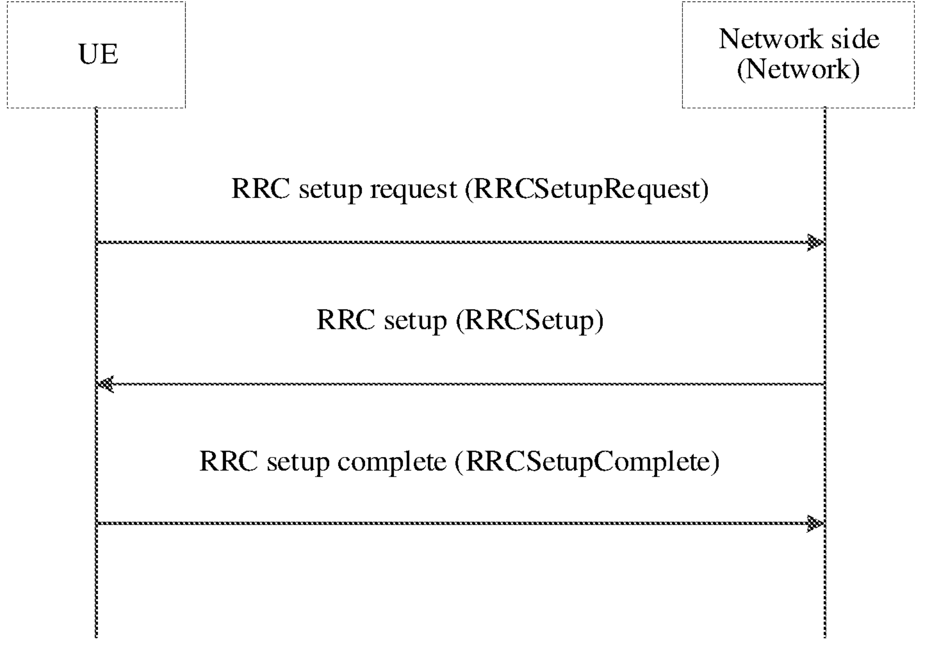
FIG. 3 is a schematic diagram of an RRC connection establishment process according to an embodiment of this application.

For example, as shown in FIG. 3, in the RRC connection establishment process, when a terminal sends an RRC setup request to a network side, the network side sends an RRC setup message to the terminal, and the terminal sends an RRC setup complete message to the network side, the configuration information of the MBS can be obtained through the RRC setup message sent by the network side.

Figure 4:
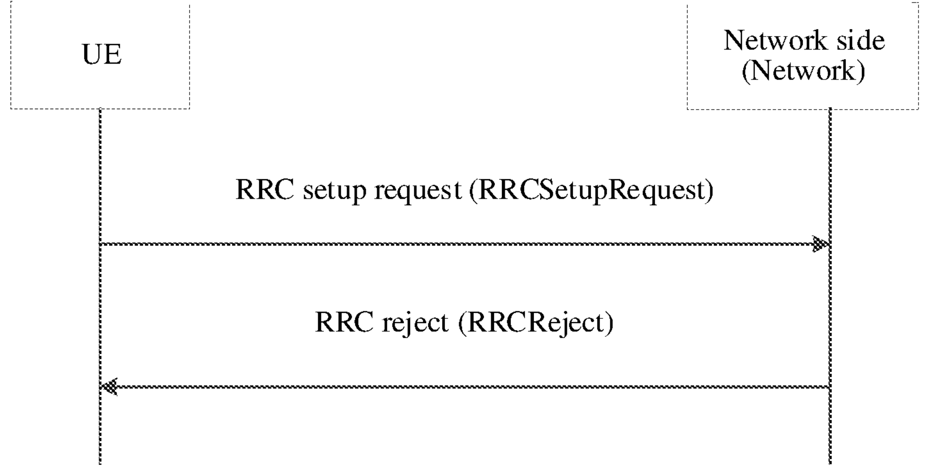
FIG. 4 is another schematic diagram of an RRC connection establishment process according to an embodiment of this application.

As shown in FIG. 4, in the RRC connection establishment process, when the terminal sends an RRC connection establishment request to the network side, and the network side sends an RRC reject message to the terminal, the configuration information of the MBS can be obtained through the RRC reject message sent by the network side.

Figure 5:
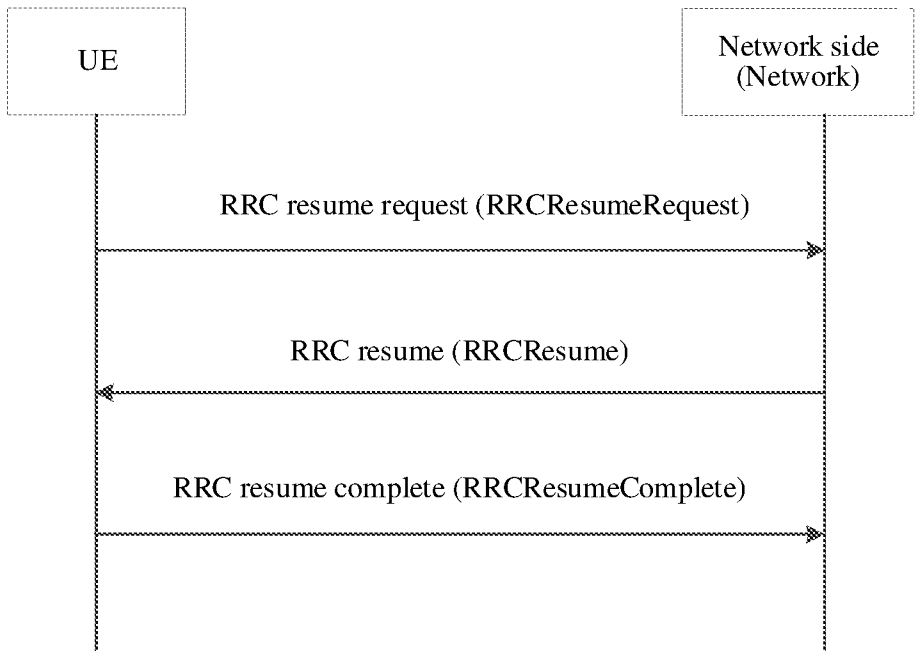
FIG. 5 is a schematic diagram of an RRC connection resume process according to an embodiment of this application.

As shown in FIG. 5, in the RRC connection resume process, when the terminal sends an RRC resume request to the network side, the network side sends an RRC resume message to the terminal, and the terminal sends an RRC resume complete message to the network side, the terminal can obtain the configuration information of the MBS through the RRC resume message sent by the network side.

Figure 6:
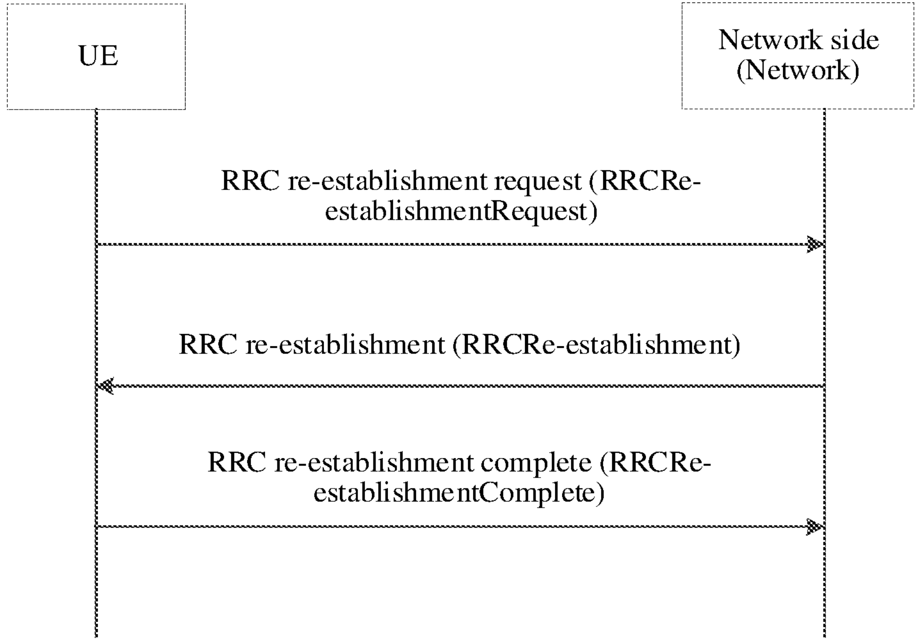
FIG. 6 is a schematic diagram of an RRC connection re-establishment process according to an embodiment of this application.
Figures 7, 8, 9:
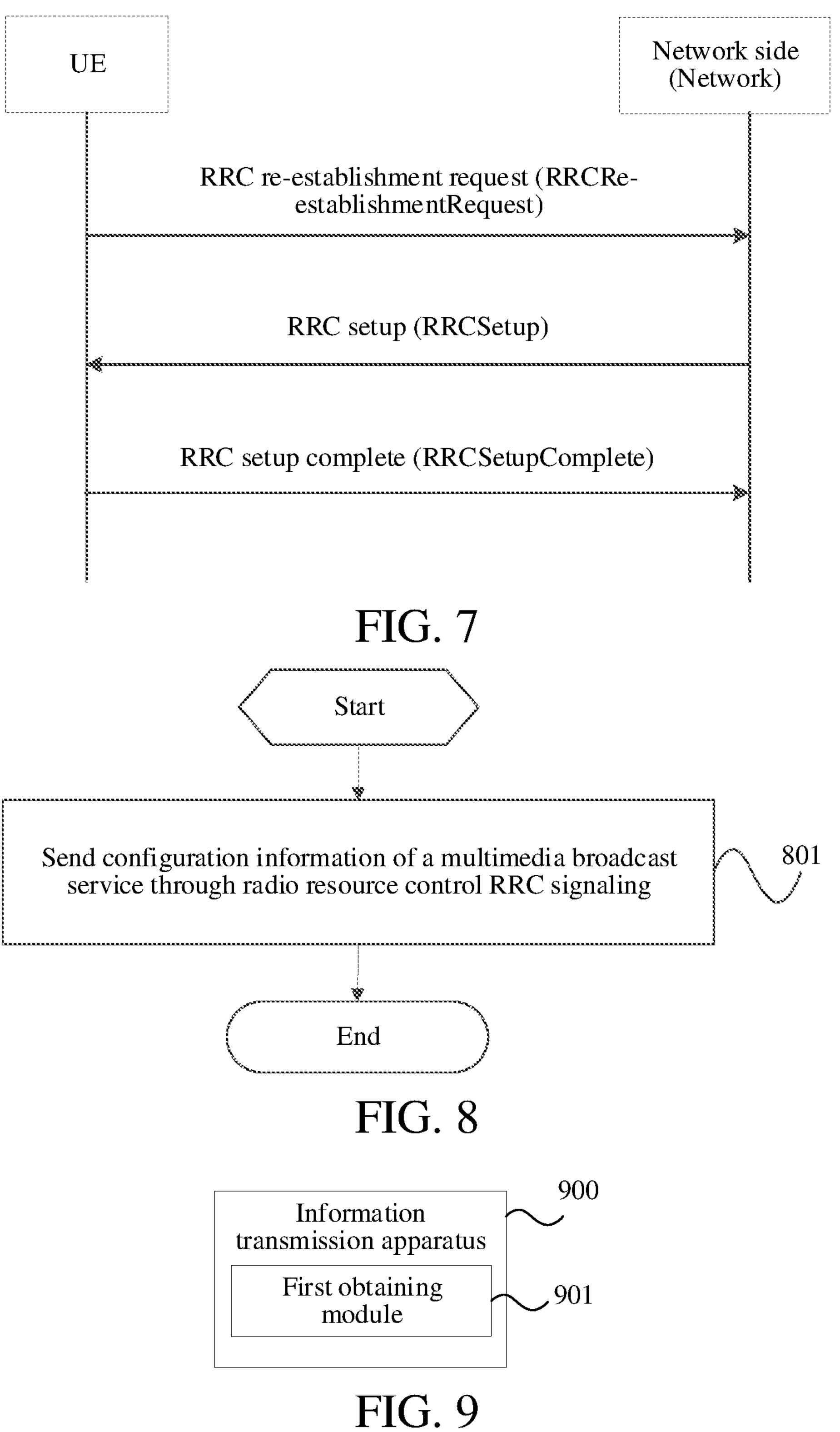
FIG. 7 is another schematic diagram of an RRC connection re-establishment process according to an embodiment of this application.
FIG. 8 is a schematic flowchart of an information transmission method applied to a network side device according to an embodiment of this application.
FIG. 9 is a schematic diagram of modules of an information transmission apparatus applied to a terminal according to an embodiment of this application.

In the RRC connection re-establishment process, as shown in FIG. 6, when the terminal sends an RRC connection re-establishment request to the network side, the network side responds to the RRC connection re-establishment and sends an RRC connection re-establishment message, and an RRC connection is re-established between the terminal and the network side; or, as shown in FIG. 7, when the network side responds to the RRC connection re-establishment and sends the RRC setup message, and an RRC connection is established between the terminal and the network side, the configuration information of the MBS can be obtained through the RRC connection re-establishment message or the RRC setup message.

Optionally, the information transmission method according to the embodiments of this application further includes:

obtaining an indication message, where the indication message is used for indicating whether the configuration information of the multimedia broadcast service changes.

Further optionally, the indication message is a short message, and a first bit or a second bit in the short message is used for indicating whether the configuration information changes, where the first bit is at least one bit that has been used in the short message, and the second bit is at least one bit that has not been used in the short message; or the indication message is downlink control information scrambled by a first radio network temporary identity RNTI, and the first RNTI is an RNTI different from an already defined RNTI.

For example, whether the configuration information of the MBS service changes is indicated through one or more of first to third bits that have already been used in the short message, or through one or more of fourth to eighth bits that have not been used in the short message, or through DCI scrambled by a new RNTI, such as an X-RNTI.

The short message is transmitted through a PDCCH scrambled by a P-RNTI and is in a DCI format 1_0. Bit 1 is a most significant bit.

In the short message, a first bit is a system information modification indication. If the first bit is set to 1, it indicates that contents of a broadcast control channel (BCCH) are modified except SIB6, SIB7, and SIB8; a second bit is an earthquake and tsunami warning system (Etws) and commercial mobile alert system (Cmas) indication. If the second bit is set to 1, it indicates an ETWS primary notification, and/or an ETWS secondary notification, and/or a CMAS notification; a third bit is a stopping paging monitoring indication. If the third bit is set to 1, it indicates that in this Paging Occasion (PO), monitoring of a PDCCH occasion for transmitting a Paging message is stopped; and fourth to eighth bits are not used in this specification release and should be ignored if received by UE. In addition, all UE monitors a PDCCH addressed by a P-PNTI, and determines whether system information is modified, whether to stop monitoring paging, and the like according to values of each bit in DCI.

Optionally, a terminal to which the first RNTI is applicable includes at least one of:

a terminal having a multimedia broadcast service capability;

a terminal interested in the multimedia broadcast service; or all terminals.

In the embodiments of this application, configuration information of an MBS service is sent to a UE through dedicated RRC signaling, and a change in a configuration of the MBS service is indicated through a short message mechanism or the like. Compared with the periodic transmission of the MCCH and the SC-MCCH, the dedicated RRC signaling is sent as needed by each terminal, thereby reducing signaling overheads and energy consumption in certain cases.

As shown in FIG. 8, the embodiments of this application further provide an information transmission method, applied to a network side device, the method including:

Step 801. Send configuration information of a multimedia broadcast service through radio resource control RRC signaling.

Optionally, the configuration information of the multimedia broadcast service MBS includes at least one of:

information related to multimedia broadcast service MBS scheduling; or information related to service continuity of the multimedia broadcast service MBS.

The information related to MBS scheduling may specifically be scheduling information of the MBS service. The information related to the service continuity of the MBS is all information related to the service continuity, such as a multimedia broadcast service situation (such as SAI of LTE) supported by a current frequency or an adjacent frequency, a multimedia broadcast service situation (such as TMGI of LTE) supported by a current cell, and the like. In the embodiments of this application, configuration information of an MBS service is sent to a UE through dedicated RRC signaling. Compared with the periodic transmission of the MCCH and the SC-MCCH, the dedicated RRC signaling is sent as needed by each terminal, thereby reducing signaling overheads and energy consumption in certain cases.

Optionally, the configuration information of the multimedia broadcast service includes at least one of:

information related to multimedia broadcast service scheduling; or information related to service continuity of the multimedia broadcast service.

Optionally, the RRC signaling includes at least one of:

an RRC reject message (RRCReject message);

an RRC re-establishment message (RRCReestablishment message);

an RRC setup message (RRCSetup message);

an RRC resume message (RRCResume message); or an RRC release message (RRCRelease message).

Optionally, the information transmission method according to the embodiments of this application further includes:

sending an indication message, where the indication message is used for indicating whether the configuration information of the multimedia broadcast service changes.

Optionally, the indication message is a short message, and a first bit or a second bit in the short message is used for indicating whether the configuration information changes, where the first bit is at least one bit that has been used in the short message, and the second bit is at least one bit that has not been used in the short message; or the indication message is downlink control information scrambled by a first radio network temporary identity RNTI, and the first RNTI is an RNTI different from an already defined RNTI.

Optionally, a terminal to which the first RNTI is applicable includes at least one of:

a terminal having a multimedia broadcast service capability;

a terminal interested in the multimedia broadcast service; or all terminals.

It needs to be noted that, the indication message is described in detail in embodiments of a terminal side. Details are not repeated herein.

In the embodiments of this application, configuration information of an MBS service is sent to a UE through dedicated RRC signaling, and a change in a configuration of the MBS service is indicated through a short message mechanism or the like. Compared with the periodic transmission of the MCCH and the SC-MCCH, the dedicated RRC signaling is sent as needed by each terminal, thereby reducing signaling overheads and energy consumption in certain cases.

It needs to be noted that, the information transmission method provided in the embodiments of this application may be performed by an information transmission apparatus applied to a terminal or a control module included in the information transmission apparatus and configured to perform the information transmission method. In the embodiments of this application, the information transmission apparatus applied to the terminal provided in the embodiments of this application is described by using an example in which the information transmission method is performed by the information transmission apparatus.

As shown in FIG. 9, according to an embodiment of this application, an information transmission apparatus 900 is further provided, and applied to a terminal. The apparatus includes:

a first obtaining module 901, configured to obtain configuration information of a multimedia broadcast service through radio resource control RRC signaling.

In the embodiments of this application, configuration information of an MBS service is sent to a UE through dedicated RRC signaling. Compared with the periodic transmission of the MCCH and the SC-MCCH, the dedicated RRC signaling is sent as needed by each terminal, thereby reducing signaling overheads and energy consumption in certain cases.

According to the information transmission apparatus provided in the embodiments of this application, the configuration information of the multimedia broadcast service includes at least one of:

information related to multimedia broadcast service scheduling; or information related to service continuity of the multimedia broadcast service.

According to the information transmission apparatus provided in the embodiments of this application, the first obtaining module includes:

a triggering submodule, configured to trigger an RRC connection event; and an obtaining submodule, configured to obtain the configuration information of the multimedia broadcast service through the RRC signaling in the RRC connection event, where the RRC connection event includes:

an RRC connection establishment process, or an RRC connection resume process, or an RRC connection re-establishment process.

According to the information transmission apparatus provided in the embodiments of this application, a triggering condition of the RRC connection event includes at least one of:

the terminal has a multimedia broadcast service capability;

the terminal is interested in the multimedia broadcast service;

the terminal is receiving the multimedia broadcast service; or a configuration of the multimedia broadcast service is updated.

According to the information transmission apparatus provided in the embodiments of this application, a cause value in the RRC connection event is a cause value already defined or a newly set cause value, the newly set cause value is a cause value different from the cause value already defined; and the cause value in the RRC connection event includes at least one of:

a value of an establishment cause during the RRC connection establishment process;

a value of a resume cause during the RRC connection resume process; or a value of a re-establishment cause during the RRC connection re-establishment process.

According to the information transmission apparatus provided in the embodiments of this application, unified access control UAC in the RRC connection establishment process or the RRC connection resume process includes at least one of:

an access attempt is directly allowed without performing a UAC check;

a defined access value; or a newly set access value, where the newly set access value is an access value different from the defined access value, and the access value includes at least one of a value of an access category or a value of an access identity.

According to the information transmission apparatus provided in the embodiments of this application, the RRC signaling includes at least one of:

an RRC reject message;

an RRC re-establishment message;

an RRC setup message;

an RRC resume message; or an RRC release message.

The information transmission apparatus provided in the embodiments of this application further includes:

a second obtaining module, configured to obtain an indication message, where the indication message is used for indicating whether the configuration information of the multimedia broadcast service changes.

According to the information transmission apparatus provided in the embodiments of this application, the indication message is a short message, and a first bit or a second bit in the short message is used for indicating whether the configuration information changes, where the first bit is at least one bit that has been used in the short message, and the second bit is at least one bit that has not been used in the short message; or the indication message is downlink control information scrambled by a first radio network temporary identity RNTI, and the first RNTI is an RNTI different from an already defined RNTI.

According to the information transmission apparatus provided in the embodiments of this application, a terminal to which the first RNTI is applicable includes at least one of:

a terminal having a multimedia broadcast service capability;

a terminal interested in the multimedia broadcast service; or all terminals.

According to the information transmission apparatus provided in the embodiments of this application, configuration information of an MBS service is sent to a UE through dedicated RRC signaling, and a change in a configuration of the MBS service is indicated through a short message mechanism or the like. Compared with the periodic transmission of the MCCH and the SC-MCCH, the dedicated RRC signaling is sent as needed by each terminal, thereby reducing signaling overheads and energy consumption in certain cases.

The information transmission apparatus in the embodiments of this application may be an apparatus, or a component, an integrated circuit, or a chip in a terminal. The apparatus may be a mobile terminal or a non-mobile terminal. Exemplarily, the mobile terminal may include, but is not limited to, types of the terminal 11 listed above, and the non-mobile terminal may be a server, a network attached storage (NAS), a personal computer (PC), a television (TV), an automated teller machine, or a self-service machine. This is not specifically limited in the embodiments of this application.

The information transmission apparatus in the embodiments of this application may be an apparatus with an operating system. The operating system may be an Android (Android) operating system, or may be an ios operating system or other possible operating systems, which is not specifically limited in the embodiments of this application.

The information transmission apparatus provided in the embodiments of this application can implement each process implemented by a method embodiment of FIG. 1 to FIG. 7 and achieve the same technical effect. To avoid repetition, details are not described herein again.

Figure 10:
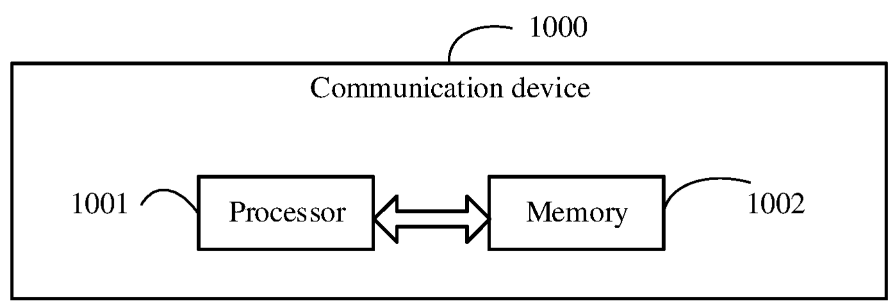
FIG. 10 is a structural block diagram of a communication device according to an embodiment of this application.

Optionally, as shown in FIG. 10, the embodiments of this application further provide a communication device 1000, including a processor 1001, a memory 1002, and a program or an instruction stored in the memory 1002 and executable on the processor 1001. For example, when the communication device 1000 is a terminal, the program or instruction is executed by the processor 1001 to implement processes of the foregoing embodiments of the information transmission method applied to the terminal, and the same technical effect can be achieved. When the communication device 1000 is a network side device, the program or instruction is executed by the processor 1001 to implement processes of the foregoing embodiments of the information transmission method applied to the network device, and the same technical effect can be achieved. To avoid repetition, details are not described herein again.

Figure 11:
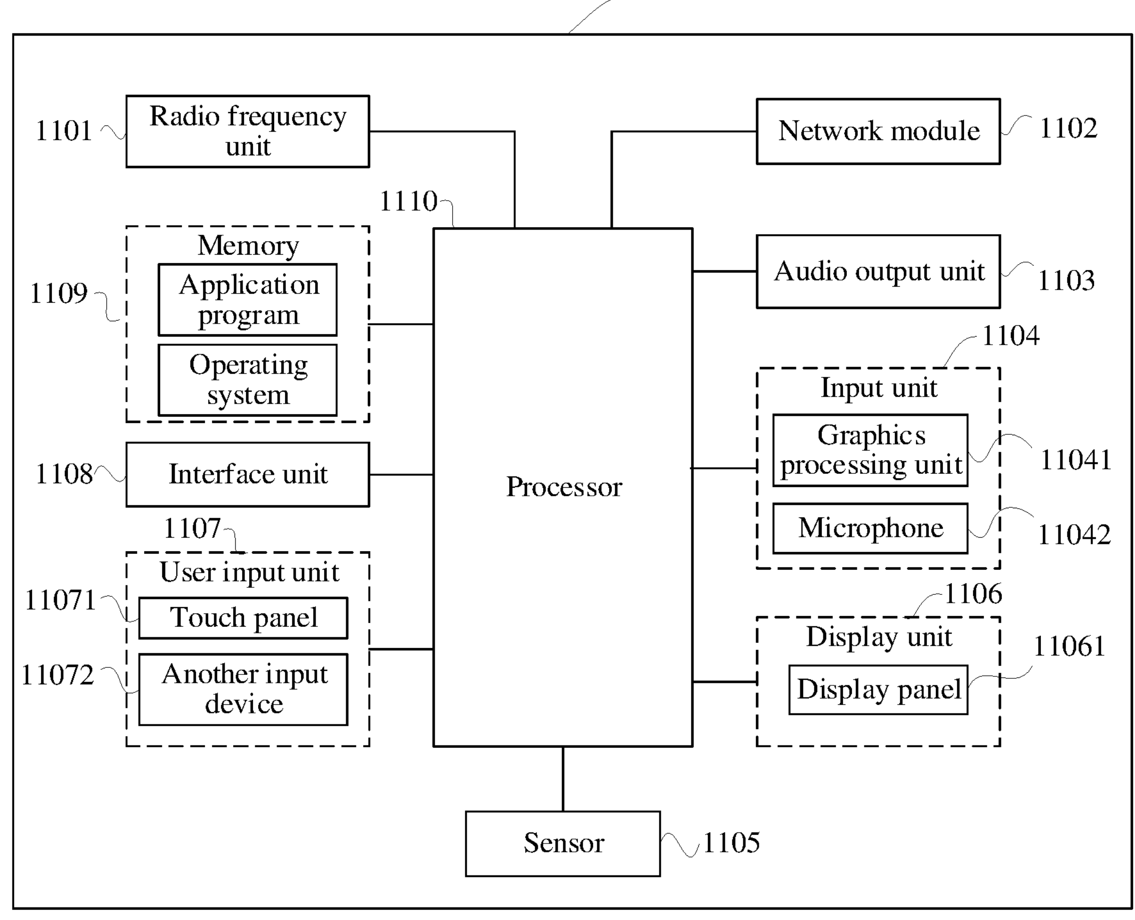
FIG. 11 is a structural block diagram of a terminal according to an embodiment of this application.

FIG. 11 is a schematic structural diagram of hardware of a terminal implementing an embodiment of this application.

The terminal 1100 includes, but is not limited to: components such as a radio frequency unit 1101, a network module 1102, an audio output unit 1103, an input unit 1104, a sensor 1105, a display unit 11011, a user input unit 1107, an interface unit 1108, a memory 1109, and a processor 1110.

Those skilled in the art may understand that the terminal 1100 may further include a power supply (such as a battery) for supplying power to the components. The power supply may logically connect to the processor 1110 by using a power supply management system, thereby implementing functions such as charging, discharging, and power consumption management, by using the power supply management system. A terminal structure shown in FIG. 6 does not constitute a limitation to the terminal, and the terminal may include more or fewer components than those shown in the figure, or some components may be combined, or a different component deployment may be used. Details are not described herein again.

It should be understood that in the embodiments of this application, the input unit 1104 may include a graphics processing unit (GPU) 11041 and a microphone 11042, and the graphics processing unit 11041 processes image data of a still picture or a video obtained by an image capture apparatus (such as a camera) in a video capture mode or an image capture mode. The display unit 1106 may include a display panel 11061. The display panel 11061 may be configured by using a liquid crystal display, an organic light-emitting diode, or the like. The user input unit 1107 includes a touch panel 11071 and another input device 11072. The touch panel 11071 is also referred to as a touch screen. The touch panel 11071 may include two parts: a touch detection apparatus and a touch controller. The another input device 11072 may include, but is not limited to, a physical keyboard, a functional key (for example, a volume control key or a switch key), a track ball, a mouse, and a joystick, and details will not be described herein again.

In the embodiments of this application, the radio frequency unit 1101 is configured to receive downlink data from a network side device and transmit the downlink data to the processor 1110 for processing; and send uplink data to the network side device. Generally, the radio frequency unit 1101 includes, but is not limited to, an antenna, at least one amplifier, a transceiver, a coupler, a low noise amplifier, a duplexer, and the like.

The memory 1109 may be configured to store a software program or instruction and various data. The memory 1109 may mainly include a program or instruction storage area and a data storage area. The program or instruction storage area may store an operating system, an application program or instruction required by at least one function (for example, a sound playback function and an image display function), and the like. In addition, the memory 1109 may include a high-speed random access memory and may also include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The memory 1109 may include, for example, at least one magnetic disk memory device, a flash memory device, or other non-volatile solid-state memory devices.

Optionally, the processor 1110 may include one or more processing units. Optionally, the processor 1110 may integrate an application processor and a modem processor, where the application processor mainly processes an operating system, a user interface, an application program or instruction, and the like, and the modem processor mainly processes wireless communication, such as a baseband processor. It may be understood that the modem processor may alternatively not be integrated into the processor 1110.

The processor 1110 is configured to obtain configuration information of a multimedia broadcast service through radio resource control RRC signaling.

According to the terminal provided in the embodiments of this application, configuration information of an MBS service is sent to a UE through dedicated RRC signaling. Compared with the periodic transmission of the MCCH and the SC-MCCH, the dedicated RRC signaling is sent as needed by each terminal, thereby reducing signaling overheads and energy consumption in certain cases.

The configuration information of the multimedia broadcast service includes at least one of:

information related to multimedia broadcast service scheduling; or information related to service continuity of the multimedia broadcast service.

Optionally, the processor 1110 is also configured to trigger an RRC connection event; and obtain the configuration information of the multimedia broadcast service through the RRC signaling in the RRC connection event;

where the RRC connection event includes:

an RRC connection establishment process, or an RRC connection resume process, or an RRC connection re-establishment process.

Optionally, a triggering condition of the RRC connection event includes at least one of:

the terminal has a multimedia broadcast service capability;

the terminal is interested in the multimedia broadcast service;

the terminal is receiving the multimedia broadcast service; or a configuration of the multimedia broadcast service is updated.

Optionally, a cause value in the RRC connection event is a cause value already defined or a newly set cause value;

the newly set cause value is a cause value different from the cause value already defined; and the cause value in the RRC connection event includes at least one of:

a value of an establishment cause during the RRC connection establishment process;

a value of a resume cause during the RRC connection resume process; or a value of a re-establishment cause during the RRC connection re-establishment process.

Optionally, unified access control UAC in the RRC connection establishment process or the RRC connection resume process includes at least one of:

an access attempt is directly allowed without performing a UAC check;

a defined access value; or a newly set access value, where the newly set access value is an access value different from the defined access value, and the access value includes at least one of a value of an access category or a value of an access identity.

Optionally, the RRC signaling includes at least one of:

an RRC reject message;

an RRC re-establishment message;

an RRC setup message;

an RRC resume message; or an RRC release message.

Optionally, the processor 1110 is further configured to:

obtain an indication message, where the indication message is used for indicating whether the configuration information of the multimedia broadcast service changes.

Optionally, the indication message is a short message, and a first bit or a second bit in the short message is used for indicating whether the configuration information changes, where the first bit is at least one bit that has been used in the short message, and the second bit is at least one bit that has not been used in the short message; or the indication message is downlink control information scrambled by a first radio network temporary identity RNTI, and the first RNTI is an RNTI different from an already defined RNTI.

Optionally, a terminal to which the first RNTI is applicable includes at least one of:

a terminal having a multimedia broadcast service capability;

a terminal interested in the multimedia broadcast service; or all terminals.

According to the terminal provided in the embodiments of this application, configuration information of an MBS service is sent to a UE through dedicated RRC signaling, and a change in a configuration of the MBS service is indicated through a short message mechanism or the like. Compared with the periodic transmission of the MCCH and the SC-MCCH, the dedicated RRC signaling is sent as needed by each terminal, thereby reducing signaling overheads and energy consumption in certain cases.

It needs to be noted that, the information transmission method provided in the embodiments of this application may be performed by an information transmission apparatus or a control module included in the information transmission apparatus and configured to perform the information transmission method. In the embodiments of this application, the information transmission apparatus provided in the embodiments of this application is described by using an example in which the information transmission method is performed by the information transmission apparatus.

Figure 12:
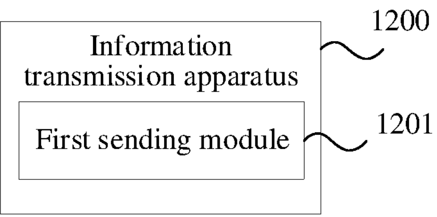
FIG. 12 is a schematic diagram of modules of an information transmission apparatus applied to a network side device according to an embodiment of this application.

As shown in FIG. 12, the embodiments of this application further provide an information transmission apparatus 1200, applied to a network side device, the apparatus including:

a first sending module 1201, configured to send configuration information of a multimedia broadcast service through radio resource control RRC signaling.

According to the information transmission apparatus provided in the embodiments of this application, the configuration information of the multimedia broadcast service includes at least one of:

information related to multimedia broadcast service scheduling; or information related to service continuity of the multimedia broadcast service.

According to the information transmission apparatus provided in the embodiments of this application, the RRC signaling includes at least one of:

an RRC reject message;

an RRC re-establishment message;

an RRC setup message;

an RRC resume message; or an RRC release message.

The information transmission apparatus provided in the embodiments of this application further includes:

a second sending module, configured to send an indication message, where the indication message is used for indicating whether the configuration information of the multimedia broadcast service changes.

According to the information transmission apparatus provided in the embodiments of this application, the indication message is a short message, and a first bit or a second bit in the short message is used for indicating whether the configuration information changes, where the first bit is at least one bit that has been used in the short message, and the second bit is at least one bit that has not been used in the short message; or the indication message is downlink control information scrambled by a first radio network temporary identity RNTI, and the first RNTI is an RNTI different from an already defined RNTI.

According to the information transmission apparatus provided in the embodiments of this application, a terminal to which the first RNTI is applicable includes at least one of:

a terminal having a multimedia broadcast service capability;

a terminal interested in the multimedia broadcast service; or all terminals.

Figure 13:
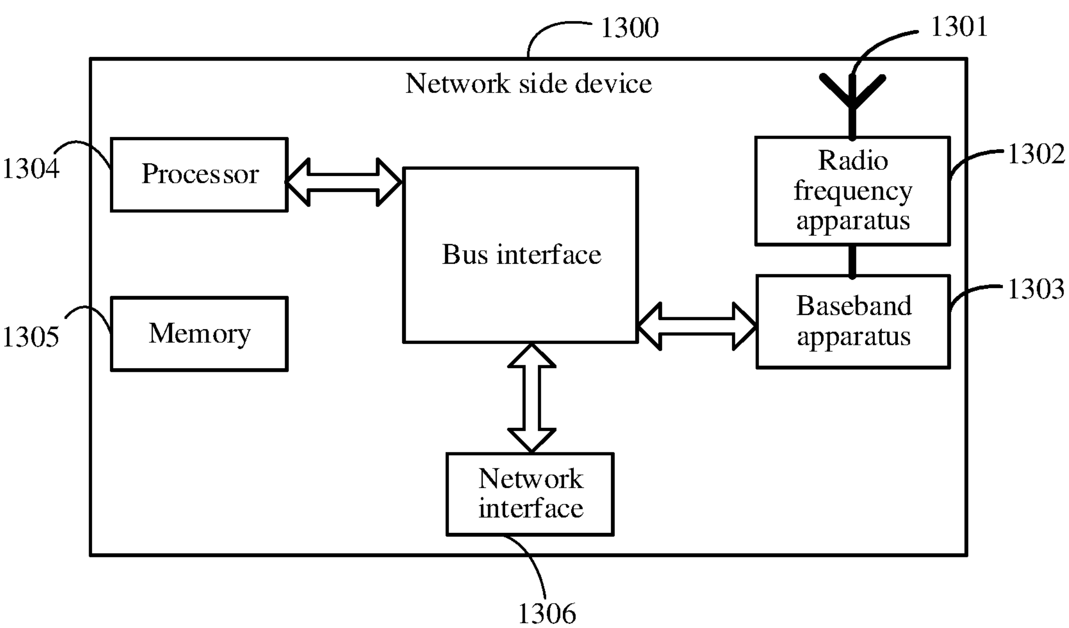
FIG. 13 is a structural block diagram of a network side device according to an embodiment of this application.

Specifically, the embodiments of this application further provide a network side device. As shown in FIG. 13, the network device 1300 includes: an antenna 1301, a radio frequency apparatus 1302, and a baseband apparatus 1303. The antenna 1301 is connected to the radio frequency apparatus 1302. In an uplink direction, the radio frequency apparatus 1302 receives information through the antenna 1301, and sends the received information to the baseband apparatus 1303 for processing. In a downlink direction, the baseband apparatus 1303 processes to-be-send information, and sends the information to the radio frequency apparatus 1302. The radio frequency apparatus 1302 processes the received information and sends the information through the antenna 1301.

The frequency band processing apparatus may be located in the baseband apparatus 1303. The method performed by the network side device in the foregoing embodiments may be implemented in the baseband apparatus 1303, and the baseband apparatus 1303 includes a processor 1304 and a memory 1305.

The baseband apparatus 1303 may include, for example, at least one baseband plate. A plurality of chips are disposed on the baseband plate. As shown in FIG. 13, one of the plurality of chips is, for example, the processor 1304, and is connected to the memory 1305, to invoke a program in the memory 1305 to perform operations of the network device in the foregoing method embodiments.

The baseband apparatus 1303 may further include a network interface 1306, configured to exchange information with the radio frequency apparatus 1302. The interface is, for example, a common public radio interface (CPRI).

Specifically, the network side device provided in the embodiments of the present application further includes: an instruction or program stored in the memory 1305 and executable on the processor 1304. The processor 1304 invokes the instruction or program in the memory 1305 to perform the method performed by each module shown in FIG. 12 and achieve the same technical effect. To avoid repetition, details are not described herein again.

The embodiments of this application further provide a readable storage medium storing therein a program or an instruction. The program or instruction is executed by a processor to implement the processes of the embodiments of the information transmission method, and the same technical effects can be achieved. To avoid repetition, details are not described herein again.

The processor is a processor in the terminal in the foregoing embodiments. The readable storage medium includes a computer-readable storage medium, for example, a computer read-only memory (ROM), a random access memory (RAM), a magnetic disk, or an optical disc.

The embodiments of this application further provide a chip, including a processor and a communication interface. The communication interface is coupled to the processor, and the processor is configured to run a program or an instruction of a network side device to implement processes of the embodiments of the information transmission method, and the same technical effect can be achieved. To avoid repetition, details are not described herein again.

It should be noted that, the chip mentioned in the embodiments of this application may also be referred to as a system-level chip, a system chip, a chip system, a system on chip, or the like.

The embodiments of this application further provide a computer program product stored in a non-volatile readable storage medium. The computer program product is executed by at least one processor to implement processes of the foregoing embodiments of the information transmission method, and the same technical effect can be achieved. To avoid repetition, details are not described herein again.

It needs to be noted that, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the embodiments of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information transmission method, performed by a terminal, the method comprising:

obtaining configuration information of a multimedia broadcast service through radio resource control (RRC) signaling;

wherein the obtaining configuration information of a multimedia broadcast service through radio resource control RRC signaling comprises:

initiating an RRC connection event; and obtaining the configuration information of the multimedia broadcast service through the RRC signaling in the RRC connection event;

wherein the RRC connection event comprises:

an RRC connection establishment process, or an RRC connection resume process, or an RRC connection re-establishment process;

wherein the RRC connection event is used for obtaining configuration information of a multimedia broadcast service, and a triggering condition of the RRC connection event comprises at least one of:

the terminal has a multimedia broadcast service capability;

the terminal is interested in the multimedia broadcast service;

the terminal is receiving the multimedia broadcast service; or a configuration of the multimedia broadcast service is updated;

wherein a cause value in the RRC connection event is a cause value already defined or a newly set cause value;

the newly set cause value is a cause value different from the cause value already defined;

wherein the already defined cause value or the newly set cause value is used for multimedia broadcast service configuration; and the cause value in the RRC connection event comprises at least one of:

a value of an establishment cause during the RRC connection establishment process;

a value of a resume cause during the RRC connection resume process; or a value of a re-establishment cause during the RRC connection re-establishment process.

2. The information transmission method according to claim 1, wherein the configuration information of the multimedia broadcast service comprises at least one of:

information related to multimedia broadcast service scheduling; or information related to service continuity of the multimedia broadcast service;

and/or wherein the RRC signaling comprises at least one of:

an RRC reject message;

an RRC re-establishment message;

an RRC setup message;

an RRC resume message; or an RRC release message.

3. The information transmission method according to claim 1, wherein unified access control (UAC) in the RRC connection establishment process or the RRC connection resume process comprises at least one of:

an access attempt is directly allowed without performing a UAC check;

a defined access value; or a newly set access value, wherein the newly set access value is an access value different from the defined access value, and the access value comprises at least one of a value of an access category or a value of an access identity.

4. The information transmission method according to claim 1, further comprising:

obtaining an indication message, wherein the indication message is used for indicating whether the configuration information of the multimedia broadcast service changes.

5. The information transmission method according to claim 4, wherein the indication message is a short message, and a first bit or a second bit in the short message is used for indicating whether the configuration information changes, wherein the first bit is at least one bit that has been used in the short message, and the second bit is at least one bit that has not been used in the short message; or the indication message is downlink control information scrambled by a first radio network temporary identity (RNTI), and the first RNTI is an RNTI different from an already defined RNTI.

6. The information transmission method according to claim 5, wherein a terminal to which the first RNTI is applicable comprises at least one of:

a terminal having a multimedia broadcast service capability;

a terminal interested in the multimedia broadcast service; or all terminals.

7. An information transmission method, performed by a network side device, the method comprising:

sending configuration information of a multimedia broadcast service through radio resource control (RRC) signaling;

wherein the sending configuration information of a multimedia broadcast service through radio resource control RRC signaling comprises:

sending the configuration information of the multimedia broadcast service through the RRC signaling in the RRC connection event;

wherein the RRC connection event comprises:

an RRC connection establishment process, or an RRC connection resume process, or an RRC connection re-establishment process;

wherein the RRC connection event is used for obtaining configuration information of a multimedia broadcast service, and a triggering condition of the RRC connection event comprises at least one of:

the terminal has a multimedia broadcast service capability;

the terminal is interested in the multimedia broadcast service;

the terminal is receiving the multimedia broadcast service; or a configuration of the multimedia broadcast service is updated;

wherein a cause value in the RRC connection event is a cause value already defined or a newly set cause value;

the newly set cause value is a cause value different from the cause value already defined;

wherein the already defined cause value or the newly set cause value is used for multimedia broadcast service configuration; and the cause value in the RRC connection event comprises at least one of:

a value of an establishment cause during the RRC connection establishment process;

a value of a resume cause during the RRC connection resume process; or a value of a re-establishment cause during the RRC connection re-establishment process.

8. The information transmission method according to claim 7, wherein the configuration information of the multimedia broadcast service comprises at least one of:

information related to multimedia broadcast service scheduling; or information related to service continuity of the multimedia broadcast service;

and/or wherein the RRC signaling comprises at least one of:

an RRC reject message;

an RRC re-establishment message;

an RRC setup message;

an RRC resume message; or an RRC release message.

9. The information transmission method according to claim 7, further comprising:

sending an indication message, wherein the indication message is used for indicating whether the configuration information of the multimedia broadcast service changes.

10. The information transmission method according to claim 9, wherein the indication message is a short message, and a first bit or a second bit in the short message is used for indicating whether the configuration information changes, wherein the first bit is at least one bit that has been used in the short message, and the second bit is at least one bit that has not been used in the short message; or the indication message is downlink control information scrambled by a first radio network temporary identity (RNTI), and the first RNTI is an RNTI different from an already defined RNTI.

11. The information transmission method according to claim 10, wherein a terminal to which the first RNTI is applicable comprises at least one of:

a terminal having a multimedia broadcast service capability;

a terminal interested in the multimedia broadcast service; or all terminals.

12. A network side device, comprising a processor, a memory, and a program or an instruction stored in the memory and executable by the processor, the program or instruction, when executed by the processor, implementing steps of the information transmission method according to claim 7.

13. The network side device according to claim 12, wherein the steps further comprises:

sending an indication message, wherein the indication message is used for indicating whether the configuration information of the multimedia broadcast service changes.

14. The network side device according to claim 13, wherein the indication message is a short message, and a first bit or a second bit in the short message is used for indicating whether the configuration information changes, wherein the first bit is at least one bit that has been used in the short message, and the second bit is at least one bit that has not been used in the short message; or the indication message is downlink control information scrambled by a first radio network temporary identity (RNTI), and the first RNTI is an RNTI different from an already defined RNTI.

15. A terminal, comprising a processor, a memory, and an instruction stored in the memory and executable by the processor, the instruction, when executed by the processor, implementing steps of an information transmission method, the steps comprising:

obtaining configuration information of a multimedia broadcast service through radio resource control (RRC) signaling;

wherein the obtaining configuration information of a multimedia broadcast service through radio resource control RRC signaling comprises:

initiating an RRC connection event; and obtaining the configuration information of the multimedia broadcast service through the RRC signaling in the RRC connection event;

wherein the RRC connection event comprises:

an RRC connection establishment process, or an RRC connection resume process, or an RRC connection re-establishment process;

wherein the RRC connection event is used for obtaining configuration information of a multimedia broadcast service, and a triggering condition of the RRC connection event comprises at least one of:

the terminal has a multimedia broadcast service capability;

the terminal is interested in the multimedia broadcast service;

the terminal is receiving the multimedia broadcast service; or a configuration of the multimedia broadcast service is updated;

wherein a cause value in the RRC connection event is a cause value already defined or a newly set cause value;

the newly set cause value is a cause value different from the cause value already defined;

wherein the already defined cause value or the newly set cause value is used for multimedia broadcast service configuration; and the cause value in the RRC connection event comprises at least one of:

a value of an establishment cause during the RRC connection establishment process;

a value of a resume cause during the RRC connection resume process; or a value of a re-establishment cause during the RRC connection re-establishment process.

16. The terminal according to claim 15, wherein unified access control (UAC) in the RRC connection establishment process or the RRC connection resume process comprises at least one of:

an access attempt is directly allowed without performing a UAC check;

a defined access value; or a newly set access value, wherein the newly set access value is an access value different from the defined access value, and the access value comprises at least one of a value of an access category or a value of an access identity.

17. The terminal according to claim 15, wherein the steps further comprises:

obtaining an indication message, wherein the indication message is used for indicating whether the configuration information of the multimedia broadcast service changes.

* * * * *